US012654209B2

(12) United States Patent
Polakowski et al.

(10) Patent No.: US 12,654,209 B2
(45) Date of Patent: Jun. 16, 2026

(54) BATTERY PACK AND SYSTEM FOR A BATTERY PACK WIRE BONDING

(71) Applicant: MILWAUKEE ELECTRIC TOOL CORPORATION, Brookfield, WI (US)

(72) Inventors: Matthew R. Polakowski, Greenfield, WI (US); Kyle C. Fassbender, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 879 days.

(21) Appl. No.: 17/860,845

(22) Filed: Jul. 8, 2022

(65) Prior Publication Data

US 2023/0011238 A1    Jan. 12, 2023

Related U.S. Application Data

(60) Provisional application No. 63/220,231, filed on Jul. 9, 2021.

(51) Int. Cl.
*B08B 7/00* (2006.01)
*B23K 26/361* (2014.01)
(Continued)

(52) U.S. Cl.
CPC .......... *B08B 7/0042* (2013.01); *B23K 26/361* (2015.10); *H01M 50/213* (2021.01); *H01M 50/298* (2021.01); *H01M 50/516* (2021.01)

(58) Field of Classification Search
CPC ............. H01M 50/213; H01M 50/298; H01M 50/505; H01M 50/516
(Continued)

(56) References Cited

U.S. PATENT DOCUMENTS 6,805,998 B2    10/2004    Jenson et al.
6,916,679 B2    7/2005    Snyder et al.
(Continued)

FOREIGN PATENT DOCUMENTS

CN    106876772 A    6/2017
CN    206364119 U    7/2017
(Continued)

OTHER PUBLICATIONS

Laser Photonics, "Prepping Lithium-Ion Batteries With a Laser," video available at <https://www.youtube.com/watch?v=goJcburP3i0> YouTube publication date: Dec. 27, 2020.
(Continued)

*Primary Examiner* — Minh N Trinh
(74) *Attorney, Agent, or Firm* — Michael Best & Friedrich LLP

(57)    ABSTRACT

A battery pack including a supporting structure, a battery cell housed within the supporting structure, a sleeve partially surrounding the battery cell, a bus bar, and a wire. The sleeve extends over a portion of a first end of the battery cell and has a laser-cut cutaway portion exposing a laser-cleaned first bonding area of the first end of the battery cell. The laser-cleaned first bonding area is positioned adjacent to an outer perimeter of the first end of the battery cell. The bus bar has a laser-cleaned second bonding area. The wire is bonded to the first and second laser-cleaned bonding areas to electrically connect the battery cell to the bus bar.

7 Claims, 6 Drawing Sheets

(51) Int. Cl.
  *H01M 50/213*     (2021.01)
  *H01M 50/298*     (2021.01)
  *H01M 50/516*     (2021.01)

(58) Field of Classification Search
  USPC .......................................... 29/623; 156/556
  See application file for complete search history.

(56)                References Cited

U.S. PATENT DOCUMENTS

| | | | |
|---|---|---|---|
| 6,924,164 | B2 | 8/2005 | Jenson |
| 6,962,613 | B2 | 11/2005 | Jenson |
| 6,986,965 | B2 | 1/2006 | Jenson et al. |
| 7,131,189 | B2 | 11/2006 | Jenson |
| 7,144,655 | B2 | 12/2006 | Jenson et al. |
| 7,157,187 | B2 | 1/2007 | Jenson |
| 7,194,801 | B2 | 3/2007 | Jenson et al. |
| 7,226,815 | B2 | 6/2007 | Takahashi |
| 7,389,580 | B2 | 6/2008 | Jenson et al. |
| 7,416,970 | B2 | 8/2008 | Takahashi |
| 7,433,655 | B2 | 10/2008 | Jacobs et al. |
| 7,877,120 | B2 | 1/2011 | Jacobs et al. |
| 7,993,773 | B2 | 8/2011 | Snyder et al. |
| 8,021,778 | B2 | 9/2011 | Snyder et al. |
| 8,044,508 | B2 | 10/2011 | Jenson et al. |
| 8,219,140 | B2 | 7/2012 | Jacobs et al. |
| 8,236,443 | B2 | 8/2012 | Snyder et al. |
| 8,394,522 | B2 | 3/2013 | Snyder et al. |
| 8,404,376 | B2 | 3/2013 | Snyder et al. |
| 8,431,264 | B2 | 4/2013 | Neudecker et al. |
| 8,445,130 | B2 | 5/2013 | Neudecker et al. |
| 8,535,396 | B2 | 9/2013 | Snyder et al. |
| 8,637,349 | B2 | 1/2014 | Jenson et al. |
| 8,761,842 | B2 | 6/2014 | Jacobs et al. |
| 9,324,675 | B2 | 4/2016 | Carpenter et al. |
| 9,440,601 | B2 | 9/2016 | Soleski et al. |
| 9,457,743 | B2 | 10/2016 | Soleski et al. |
| 9,576,884 | B2 | 2/2017 | Williams |
| 9,576,932 | B2 | 2/2017 | Williams et al. |
| 9,620,439 | B2 | 4/2017 | Williams et al. |
| 9,634,296 | B2 | 4/2017 | Johnson et al. |
| 9,660,244 | B2 | 5/2017 | Dinkelman et al. |
| 9,698,403 | B2 | 7/2017 | Soleski et al. |
| 9,711,778 | B2 | 7/2017 | Dekeuster et al. |
| 9,716,263 | B2 | 7/2017 | Dulle et al. |
| 9,722,231 | B2 | 8/2017 | Soleski et al. |
| 9,793,197 | B2 | 10/2017 | Williams |
| 9,793,523 | B2 | 10/2017 | Snyder et al. |
| 9,825,273 | B2 | 11/2017 | Dulle |
| 9,831,482 | B2 | 11/2017 | Balk et al. |
| 9,899,658 | B2 | 2/2018 | Biskup et al. |
| 9,923,184 | B2 | 3/2018 | De Arroyabe et al. |
| 9,966,592 | B2 | 5/2018 | Stern et al. |
| 9,985,268 | B2 | 5/2018 | Houchin-Miller et al. |
| 9,997,763 | B2 | 6/2018 | Biskup et al. |
| 10,008,438 | B2 | 6/2018 | Williams |
| 10,032,649 | B2 | 7/2018 | Williams et al. |
| 10,032,744 | B2 | 7/2018 | Williams et al. |
| 10,044,018 | B2 | 8/2018 | Soleski et al. |
| 10,062,897 | B2 | 8/2018 | Stern et al. |
| 10,103,374 | B2 | 10/2018 | Balk et al. |
| 10,193,193 | B2 | 1/2019 | Na et al. |
| 10,211,444 | B2 | 2/2019 | Dekeuster et al. |
| 10,263,238 | B2 | 4/2019 | Hwang et al. |
| 10,312,111 | B2 | 6/2019 | Williams et al. |
| 10,468,654 | B2 | 11/2019 | Dulle et al. |
| 10,511,006 | B2 | 12/2019 | Dekeuster et al. |
| 10,581,056 | B2 | 3/2020 | Dulle et al. |
| 10,593,925 | B2 | 3/2020 | Dinkelman et al. |
| 10,608,231 | B2 | 3/2020 | Dulle |
| 10,615,146 | B2 | 4/2020 | Williams et al. |
| 10,741,986 | B2 | 8/2020 | Vergossen |
| 10,950,845 | B2 | 3/2021 | Hwang et al. |
| 2001/0032666 | A1 | 10/2001 | Jenson et al. |
| 2004/0185310 | A1 | 9/2004 | Jenson et al. |
| 2005/0045223 | A1 | 3/2005 | Jenson et al. |
| 2006/0021214 | A1 | 2/2006 | Jenson et al. |
| 2007/0264564 | A1 | 11/2007 | Johnson et al. |
| 2008/0003496 | A1 | 1/2008 | Neudecker et al. |
| 2012/0135296 | A1 | 5/2012 | Itoi et al. |
| 2014/0030584 | A1 | 1/2014 | Johnson et al. |
| 2015/0072209 | A1 | 3/2015 | Tyler et al. |
| 2016/0056444 | A1 | 2/2016 | Hwang et al. |
| 2016/0141585 | A1 | 5/2016 | Berg et al. |
| 2016/0164063 | A1 | 6/2016 | Angerbauer et al. |
| 2016/0190527 | A1 | 6/2016 | Hsu et al. |
| 2016/0308173 | A1 | 10/2016 | Neudecker et al. |
| 2018/0159099 | A1 | 6/2018 | Hsu et al. |
| 2020/0020920 | A1 | 1/2020 | Dulle et al. |
| 2020/0127267 | A1 | 4/2020 | Dulle et al. |
| 2020/0161621 | A1 | 5/2020 | Dulle |
| 2020/0273838 | A1 | 8/2020 | Williams et al. |
| 2020/0350635 | A1 | 11/2020 | Counts et al. |
| 2021/0203028 | A1* | 7/2021 | Ahn .................... H01M 50/289 |
| 2023/0011238 | A1* | 1/2023 | Polakowski ......... B23K 26/361 |

FOREIGN PATENT DOCUMENTS

| | | |
|---|---|---|
| CN | 107335928 A | 11/2017 |
| CN | 107507997 A | 12/2017 |
| CN | 206758565 U | 12/2017 |
| CN | 206907843 U | 1/2018 |
| CN | 206947391 U | 1/2018 |
| CN | 207104094 U | 3/2018 |
| CN | 207205577 U | 4/2018 |
| CN | 109093268 A | 12/2018 |
| CN | 208289225 U | 12/2018 |
| CN | 106374133 B | 3/2019 |
| CN | 110480321 A | 11/2019 |
| CN | 209963160 U | 1/2020 |
| CN | 210092145 U | 2/2020 |
| CN | 110994004 A | 4/2020 |
| CN | 111211358 A | 5/2020 |
| CN | 211605338 U | 9/2020 |
| CN | 212858461 U | 4/2021 |
| DE | 102012223720 A1 | 6/2014 |
| DE | 102012223756 A1 | 6/2014 |
| DE | 102017004939 A1 | 7/2018 |
| JP | 2002273592 A | 9/2002 |
| JP | 2017126522 A | 7/2017 |
| JP | 2019102218 A | 6/2019 |
| KR | 1020140022531 A | 2/2014 |
| KR | 1020210086089 A | 7/2021 |
| WO | 2013050089 A1 | 4/2013 |

OTHER PUBLICATIONS

International Search Report and Written Opinion for Application No. PCT/US2022/036540 dated Oct. 28, 2022 (11 pages).

* cited by examiner

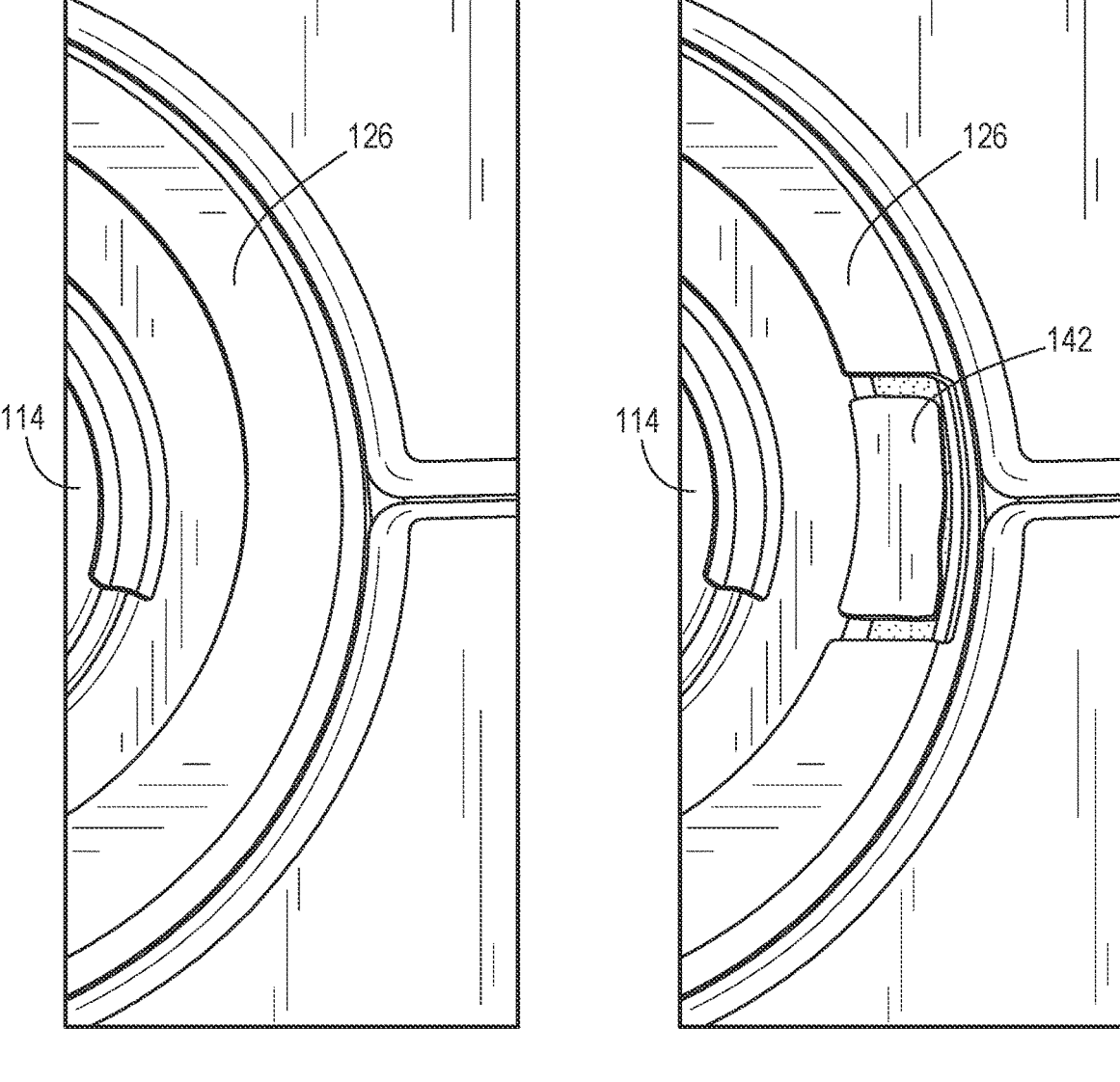
*FIG. 5A*           *FIG. 5B*

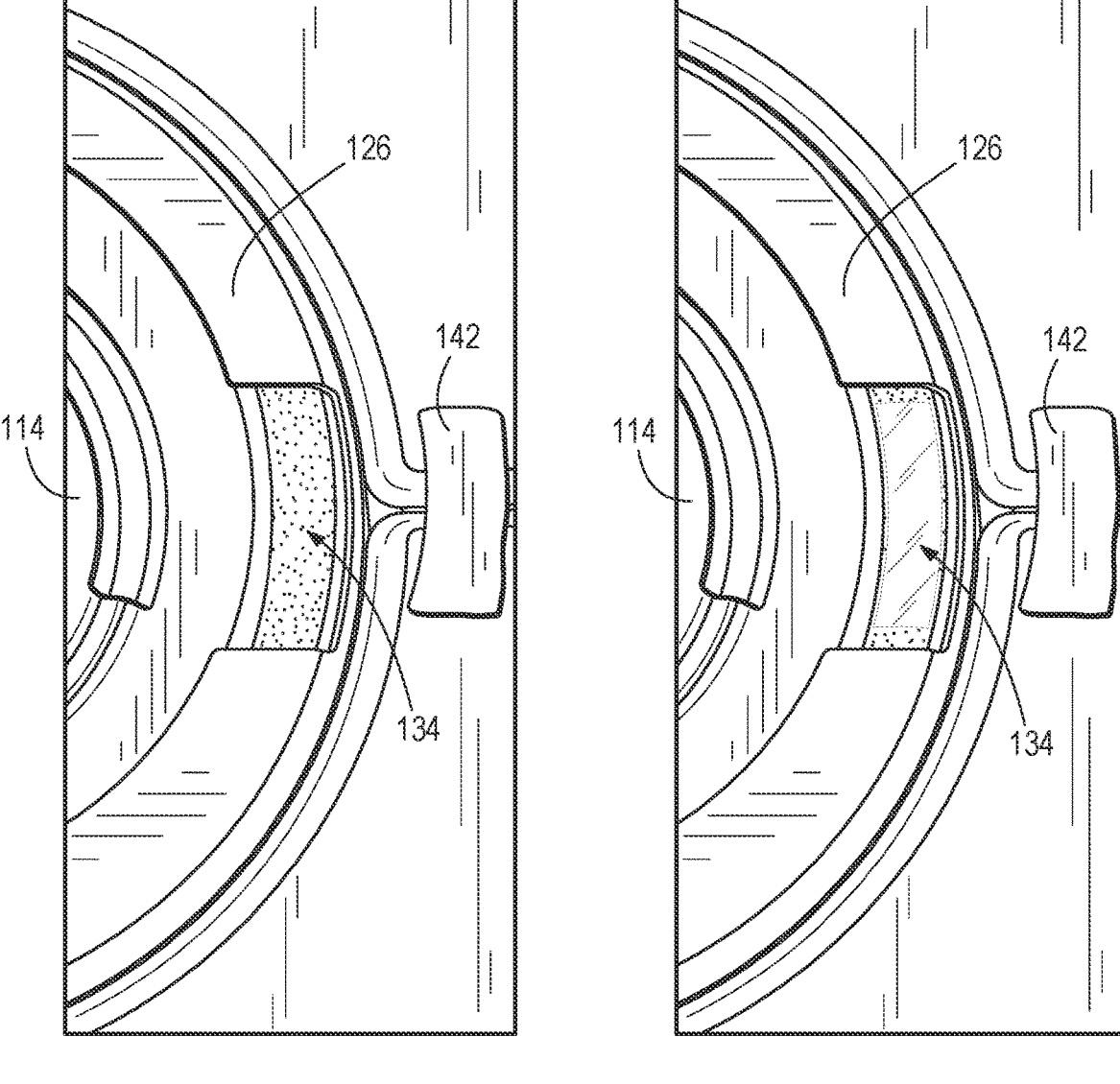
FIG. 5C                    FIG. 5D

BATTERY PACK AND SYSTEM FOR A BATTERY PACK WIRE BONDING

CROSS-REFERENCE TO RELATED APPLICATIONS

This application claims priority to and the benefits of U.S. Provisional Application No. 63/220,231, filed Jul. 9, 2021, the disclosure of which is hereby incorporated by reference herein in its entirety.

FIELD OF THE DISCLOSURE

The present disclosure relates to laser cleaning battery components in preparation for wire bonding.

BACKGROUND OF THE DISCLOSURE

Laser systems can be used to remove rust, oil, paint, and the like from contaminated areas of surfaces. Surface preparation times can be reduced, expensive chemicals and consumables are eliminated, and the cleaning process may be streamlined.

SUMMARY

According to one aspect of the present disclosure, a method for preparing a battery pack for wire bonding is described. The battery pack includes a battery cell, a sleeve sounding the battery cell, and a bus bar. The method comprises laser cutting away a portion of the sleeve surrounding the battery cell. A cutaway portion of the sleeve is removed to expose a first bonding area on the battery cell. The first bonding area of the battery cell is laser cleaned. A portion of the bus bar is laser cleaned to form a second bonding area on the bus bar. The first and second bonding areas are detected with a vision system.

According to another aspect of the present disclosure, a battery pack comprises a supporting structure, a battery cell housed within the supporting structure, a sleeve partially surrounding the battery cell, a bus bar, and a wire. The sleeve extends over a portion of a first end of the battery cell and has a laser-cut cutaway portion exposing a laser-cleaned first bonding area of the first end of the battery cell. The laser-cleaned first bonding area is positioned adjacent to an outer perimeter of the first end of the battery cell. The bus bar has a laser-cleaned second bonding area. The wire is bonded to the first and second laser-cleaned bonding areas to electrically connect the battery cell to the bus bar.

According to further aspects of the present disclosure, a machine for wire bonding a battery pack includes a light source configured to emit a laser beam, a vision system including one or more cameras, and a control unit configured to communicate with the vision system and to position the laser beam. The battery pack includes a battery cell, a sleeve surrounding the battery cell, a bus bar having a first material layer, and a wire. The laser beam is configured to prepare the battery cell for bonding by creating a first bonding area on the battery cell. The laser beam is configured to prepare the bus bar for bonding by creating a second bonding area on the bus bar. The vision system is configured to detect the first bonding area and the second bonding area. The laser beam is configured to weld the wire to the first bonding area and to the second bonding area.

Additional features and aspects of the disclosure will become apparent by consideration of the following detailed description and accompanying drawings.

BRIEF DESCRIPTION OF THE DRAWINGS

FIG. 5A is a perspective view of a sleeved battery cell of the battery pack of FIG. 2, according to some implementations of the present disclosure.

FIG. 5B is a perspective view of the sleeved battery cell of the battery pack of FIG. 2 with the portion of the sleeve cut, according to some implementations of the present disclosure.

FIG. 5C is a perspective view of the sleeved battery cell of the battery pack of FIG. 2 with a portion of the sleeve removed, according to some implementations of the present disclosure.

FIG. 5D is a perspective view of the sleeved battery cell of the battery pack of FIG. 2 with a bonding area of the battery cell cleaned using the laser cleaning machine, according to some implementations of the present disclosure.

DETAILED DESCRIPTION

Figure 1:
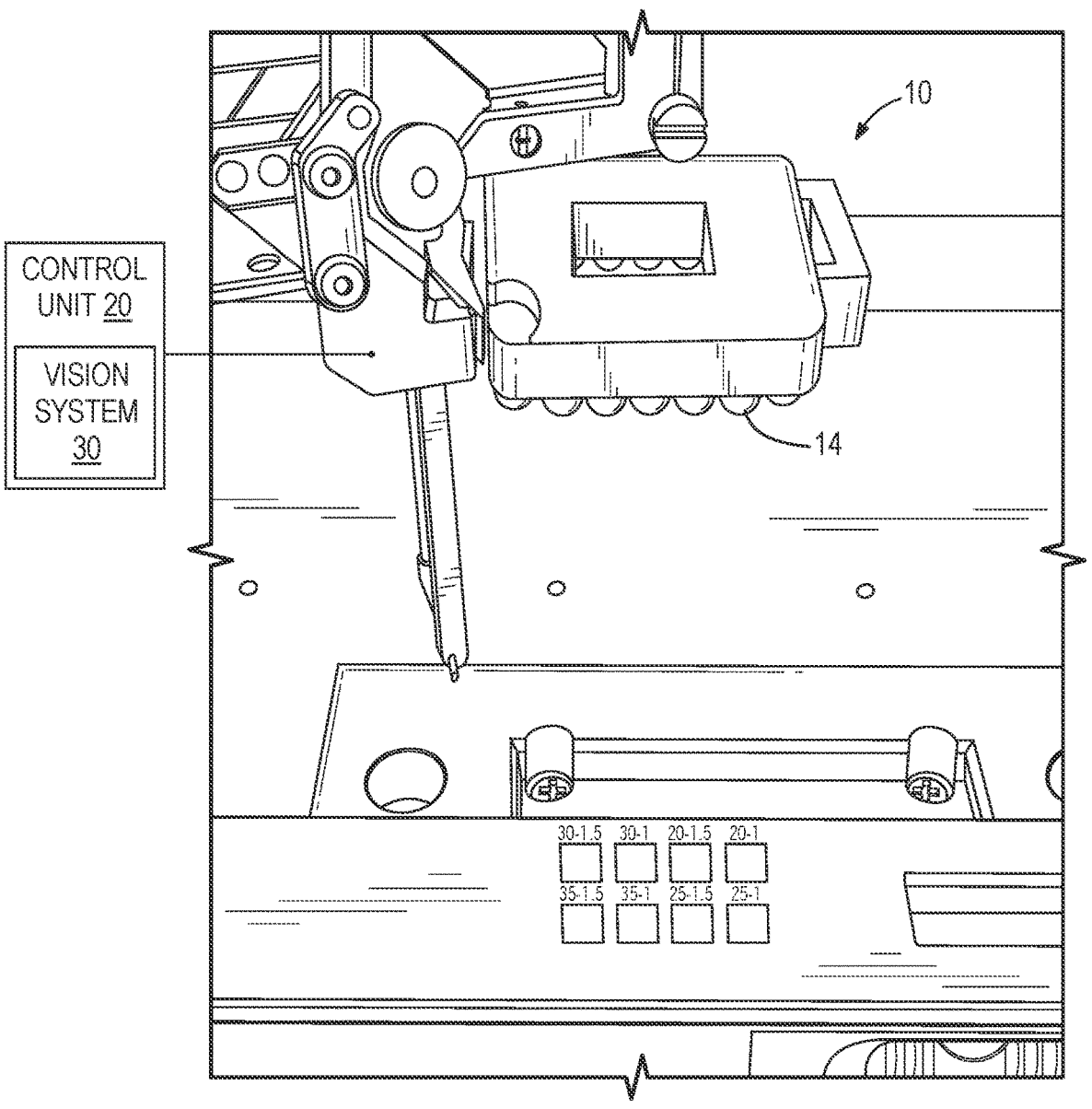
FIG. 1 is a perspective view of a laser cleaning and wire bonding machine, according to some implementations of the present disclosure.

Before any exemplary implementations of the invention are explained in detail, it is to be understood that the invention is not limited in its application to the details of construction and the arrangement of components set forth in the following description or illustrated in the following drawings. The invention is capable of other implementations and of being practiced or of being carried out in various ways. Also, it is to be understood that the phraseology and terminology used herein is for the purpose of description and should not be regarded as limiting.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

In addition, it should be understood that implementations of the present disclosure may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one implementation, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized in the described implementations. For example, "servers" and "computing devices" described in the specification can include one or more processing units, one or more computer-readable medium modules, one or more input/output interfaces, and various connections (e.g., a system bus) connecting the components.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

The implementation(s) described below and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

Figure 2:
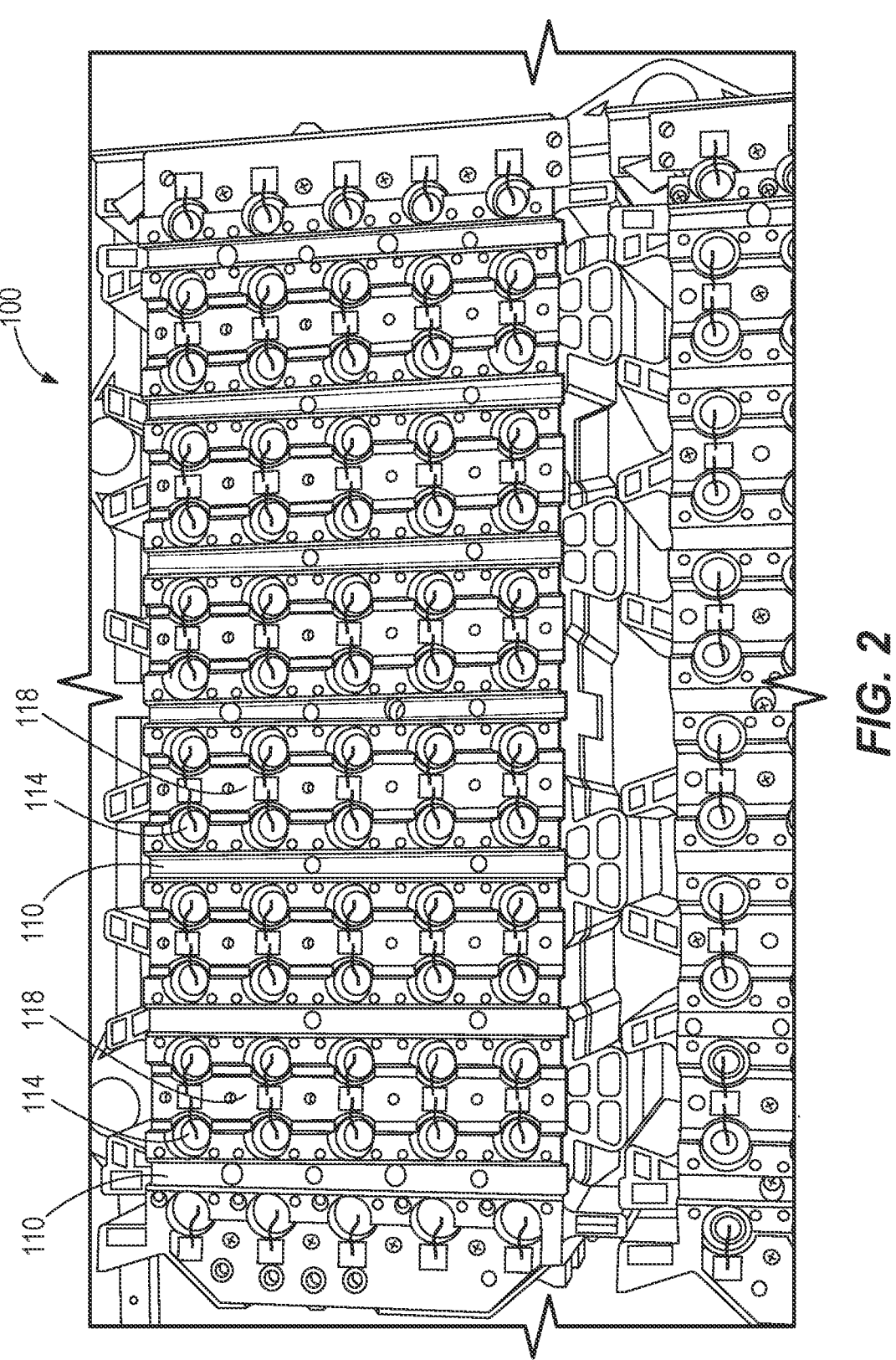
FIG. 2 is a perspective view of a plurality of battery cells of a battery pack, according to some implementations of the present disclosure.

FIG. 1 illustrates a laser cleaning and welding machine 10 including one or more light sources 14 configured to emit a laser, which may be used to clean a component of a battery pack 100 (FIG. 2). For example, the machine 10 may emit a pulsed laser beam to precisely irradiate and vaporize a layer of contaminants on the components until a desired depth of ablation has been reached. In some implementations, the laser beam(s) emitted by the light source 14 may be used to etch, mark, or engrave a component of the battery pack 100. In some implementations, the laser beam(s) emitted by the light source 14 may also be used in a laser welding process. In other implementations, the machine 10 may include an alternative welding machine (e.g., spot or contact welding machines).

The machine 10 may include a control unit 20 (schematically illustrated) that adjusts the position of the laser beam(s) emitted by the light source 14 and selectively activates the light source 14 to emit laser beam(s) to clean and weld different portions of the battery pack 100. The machine 10 may include a vision system 30 (e.g., having one or more cameras) that detects specific portions of the battery pack 100 and communicates with the control unit 20. In response to the communication from the vision system 30, the control unit 20 is operable to implement an automatic cleaning and welding protocol during the manufacturing process of the battery pack 100. In other implementations, the machine 10 may be a hand-held system that is operated by a user to clean the components of the battery pack 100.

Figure 3:
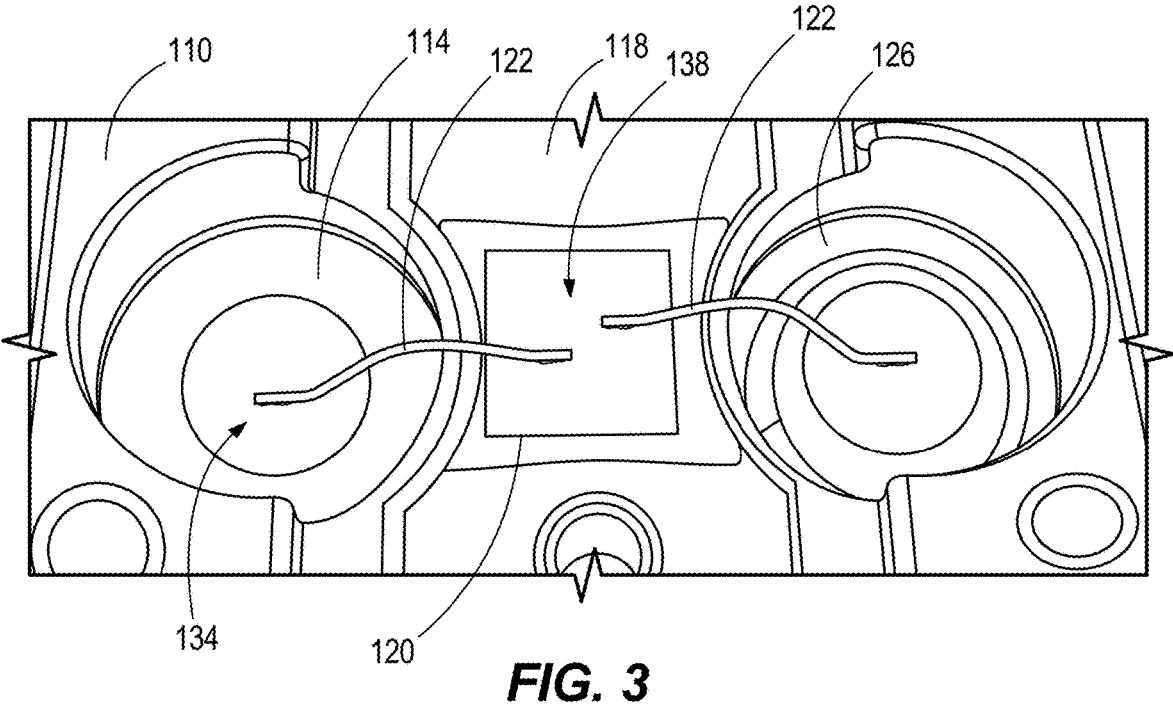
FIG. 3 is an isolated perspective view of the battery cells wire bonded to a bus bar, according to some implementations of the present disclosure.
Figure 4:
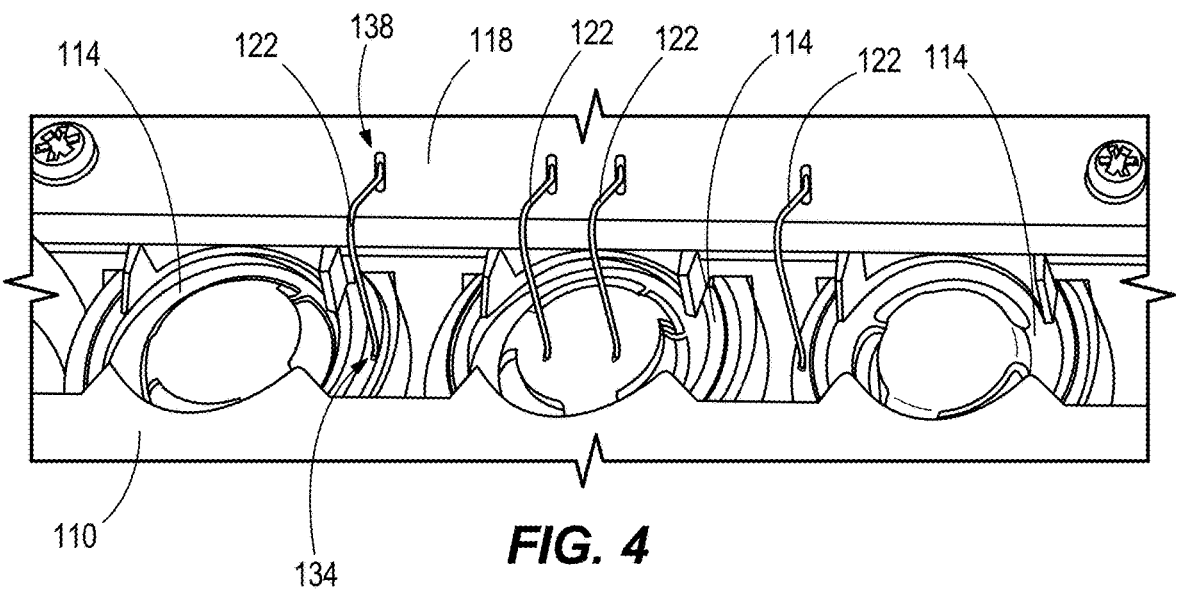
FIG. 4 is another isolated perspective view of the battery cells wire bonded to the bus bar, according to some implementations of the present disclosure.

Now with reference to FIGS. 2-4, the battery pack 100 includes a support structure 110, a plurality of cells 114 housed within the support structure 110, and a plurality of bus bars 118 extending between adjacent cells 114. Each battery cell 114 is electrically connected to the bus bar 118 via a wire 122 (FIGS. 3 and 4). The battery cells 114 may have an end defined thereon where positive and negative terminals of the battery cell 114 can be exposed, such as where the battery cells 114 are single sided battery cells that are arranged in series (FIG. 4). For example, the wires 122 may be connected to the bus bar 118 in an alternating fashion to the negative terminal or the positive terminal of the battery cell 114. The cells 114 may also be connected to an adjacent busbar (not shown) in a similar alternating fashion. The cells 114 may further include a second wire (not shown) that connects the cells 114 to a ground portion within the battery pack 100.

As shown in FIGS. 3 and 4, the battery cell 114 includes a first bonding area 134 and the bus bar 118 includes a second bonding area 138. In some implementations, the battery cell 114 may include an exposed top surface (FIG. 3) that forms the first bonding area 134. In other implementations, the first bonding area 134 may be formed by removing a portion 142 (FIGS. 5B-5D) of a sleeve 126 (see also FIGS. 4 and 5A-D), described in more detail below.

As shown in FIG. 5A-D, the cells 114 may include the sleeve 126 to electrically insulate adjacent cells 114 within the battery pack 100. In the illustrated implementation, the sleeve 126 partially surrounds the cell 114 and extends over a portion of the end of the battery cell. In order to electrically connect the battery cells 114 to the bus bar 118, the portion 142 (FIGS. 5B-5D) of the sleeve 126 may be removed to form the first bonding area 134. In other words, the sleeve 126 may have a notch or cut-out defined therein, which exposes the first bonding area 134 of the end of the battery cell 114 adjacent an outer perimeter of the end of the battery cell 114. The wire 122 is bonded to the first bonding area 134 formed on the battery cell 114 and the second bonding area 138 formed on the bus bar 118.

In order to provide a sufficient electrical connection between the bus bar 118 and the cells 114, the bonding areas 134, 138 must be sufficiently clean (e.g., free of any rust or debris). For example, the machine 10 may be used to clean the bonding areas 134, 138 the battery cell 114 and the bus bar 118 in preparation for wire bonding the battery cell 114 to the bus bar 118. In some implementations, at least a portion of the bus bar 118 may be formed of anodized aluminum (FIG. 3) (e.g., a first material layer), which may provide electrical insulation and short circuit protection for the battery pack 100. In such an implementation, the light source 14 may emit a laser beam to clean the second bonding area 138 of the bus bar 118 in preparation of bonding the wire 122 to the bus bar 118 and the battery cell 114. In other words, the laser beam(s) emitted by the light source 14 may remove layers of the anodized aluminum (e.g., a surface layer of anodized aluminum) to form the second bonding area 138. Due to detectable differences in the contrast between the second bonding area 138 and the remainder of the anodized aluminum bus bar 118, the vision system 30 of the machine 10 can detect the second bonding area 138 more efficiently during laser cleaning and wire bonding. In some implementations, a layer or coating 120 may be provided on a surface of the bus bar 118. The coating 120 may surround the second bonding area 138 and may have a contrast in color, thickness, or the like compared to the remainder of the bus bar 118. For example, the coating 120 may be painted with a marker or paint. The contrast of the coating 120 may be detected by the vision system 30 to more easily detect the second bonding area 138 prior to laser cleaning and/or bonding the wire 122 to the second bonding area 138. In some implementations, the coating 120 may be applied to the bus bar 118 prior to laser cleaning, such that the laser beam(s) remove both the coating 120 and one or more layers of the bus bar 118 to form the second bonding area 138. In addition, forming the bonding areas 134, 138 on a single side of the cell 114 (e.g., the top of the cell) allows for wire bonding to occur on the single side of the battery pack 100, which reduces manufacturing time of the battery pack 100.

Figure 6:
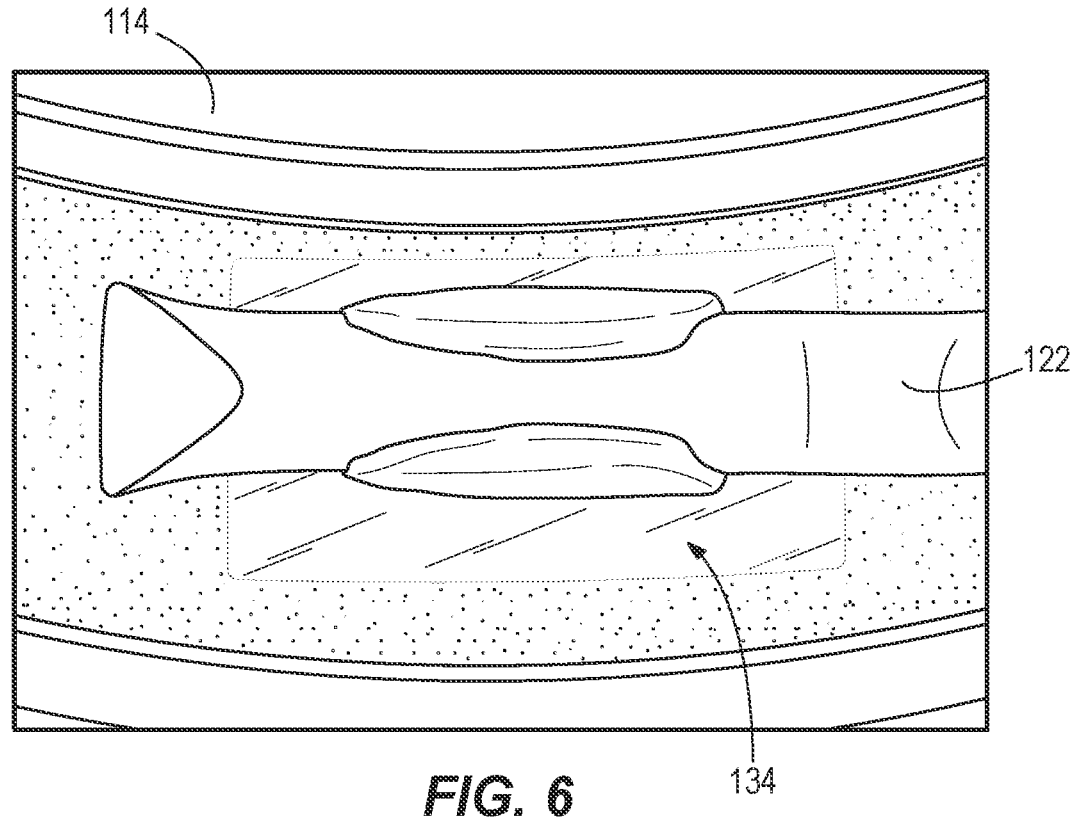
FIG. 6 is an isolated perspective view of the bonding area of the battery cell cleaned using the laser cleaning machine, according to some implementations of the present disclosure

Now with reference to FIGS. 5A-6, the method of preparing the battery cell 114 with the sleeve 126 for wire bonding is illustrated. During the process, the portion 142 of the cell sleeve 126 is removed to form the first bonding area 134 (FIGS. 5C, 5D and 6) for the wire 122 to be bonded to. In the illustrated implementation, the laser beam(s) of the machine 10 may be used to cut the portion 142 of the sleeve 126. For example, the control unit 20 of the machine 10 may activate the light source 14 and move the laser beam(s) emitted by the light source 14 in a predetermined pattern to cut the portion 142 of the sleeve 126. In the illustrated implementation, the predetermined pattern the laser beam(s) emitted by the light source 14 are moved to create a generally rectangular cut-out in the sleeve 126 (e.g., to create square corners of the sleeve 126 on the battery cell 114). In other implementations, the predetermined pattern the laser beam(s) emitted by the light source 14 are moved may create a circular cut-out, an arc cut-out, a triangular cut-out, or the like in the sleeve 126.

Once the sleeve 126 is cut, the portion 142 (e.g., a cutaway) of the sleeve 126 is removed (FIG. 5C). For example, the portion 142 of the sleeve 126 may be removed using compressed air, a vacuum, a brush, gravity, or the like to expose the first bonding area 134. In other implementations, the control unit 20 may move the laser beam(s) emitted by the light source 14 within the predetermined pattern to melt the portion 142 of the sleeve 126 back on itself and towards the edge of the cell 114. Once the portion 142 of the sleeve 126 is removed, the first bonding area 134 may be cleaned using the laser beam(s) emitted by the light source 14 in preparation for wire bonding the wire 122 to the battery cell 114.

Figure 7:
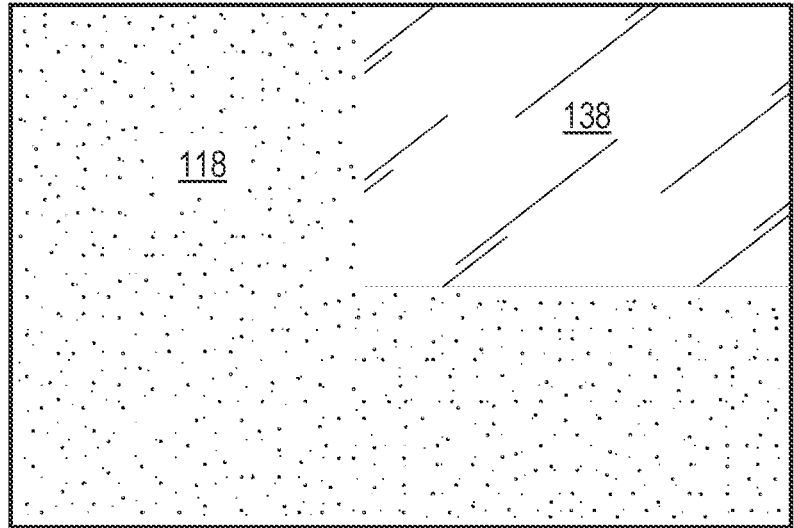
FIG. 7 is an isolated view of the bus bar, illustrating a bonding area of the bus bar cleaned using the laser cleaning machine, according to some implementations of the present disclosure.

Once the first bonding area 134 is cleaned, the control unit 20 of the machine 10 may move the laser beam(s) emitted by the light source 14 to clean the second bonding area 138 of the bus bar 118. The control unit 20 may move the laser beam(s) emitted by the light source 14 to sequentially clean the bonding areas 134, 138 for each battery cell 114 of the battery pack 100. Following the cleaning process, the vision system 30 of the machine 10 may be used to detect the position of the bonding areas 134, 138 and position the wire 122 in contact with the detected first and second bonding areas 134, 138 to initiate a wire bonding process. The control unit 20 of the machine 10 may then activate the laser beam(s) emitted by the light source 14 to bond the wires to each of the bonding areas 134, 138. For example, FIG. 6 illustrates the first bonding area 134 after the wire 122 is bonded to the battery cell 114. During the wire bonding process, the anodized aluminum construction of the bus bar 118 allows the vision system 30 of the machine 10 to detect the second bonding area 138. As shown in FIG. 7, a contrast (e.g., a visual contrast) is formed between the second bonding area 138 and the remainder of the bus bar 118, which allows the vision system 30 to detect the second bonding area 138. Compared to standard detection systems that detect the corner of the bus bar 118, the machine 10 can detect the second bonding area 138 due to the contrast formed between the second bonding area 138 and the remainder of the bus bar 118, which reduces the amount of parts in the battery pack 100 that require critical part dimensions with tight tolerances.

By way of example, the following alternative implementations are illustrative examples of the present disclosure.

Alterative Implementations

Alternative Implementation A: In some implementations, a battery pack has a battery cell, a sleeve surrounding the battery cell, and a bus bar. A method of preparing the battery pack for wire bonding includes laser cutting away a portion of the sleeve surrounding the battery cell. A cutaway portion of the sleeve is removed to expose a first bonding area on the battery cell. The first bonding area of the battery cell is laser cleaned. A portion of the bus bar is laser cleaned to form a second bonding area on the bus bar. The first and second bonding areas are detected with a vision system Alternative Implementation B: In some implementation, a method of preparing a battery pack for wire bonding of Alternative Implementation A, further includes the first and second bonding areas being detected with the vision system by detecting a contrast between the second bonding area and a reminder of the bus bar.

Alternative Implementation C: In some implementations, a method of preparing a battery pack for wire bonding according to any one of Alternative Implementations A to B, further includes laser cleaning the portion of the bus bar to form the second bonding area by removing a surface layer of anodized aluminum on the bus bar to form the contrast between the second bonding area and the remainder of the bus bar.

Alternative Implementation D: In some implementations, a method of preparing a battery pack for wire bonding according to any one of Alternative Implementations A to C, further includes laser cutting away the portion of the sleeve surrounding the battery cell along a predetermined pattern. The predetermined pattern is rectangular, circular, or triangular.

Alternative Implementation E: In some implementations, a method of preparing a battery pack for wire bonding according to any one of Alternative Implementations A to D, further includes a light source activated via a control unit to emit a pulsed laser beam for cutting the portion of the sleeve.

Alternative Implementation F: In some implementations, a method of preparing a battery pack of for wire bonding according to any one of Alternative Implementations A to E, further includes the first bonding area of the battery cell being exposed by removing the cutaway portion with compressed air.

Alternative Implementation G: In some implementations, a method of preparing a battery pack for wire bonding according to any one of Alternative Implementations A to F, further includes a wire is positioned in contact with the detected first and second bonding areas. The wire is bonded to the first and second bonding areas to electrically connect the battery cell to the bus bar.

Alternative Implementation H: In some implementations, a battery pack includes a supporting structure, a battery cell housed within the supporting structure, a sleeve partially surrounding the battery cell, a bus bar, and a wire. The sleeve extends over a portion of a first end of the battery cell and has a laser-cut cutaway portion exposing a laser-cleaned first bonding area of the first end of the battery cell. The laser-cleaned first bonding area is positioned adjacent to an outer perimeter of the first end of the battery cell. The bus bar has a laser-cleaned second bonding area. The wire is bonded to the first and second laser-cleaned bonding areas to electrically connect the battery cell to the bus bar.

Alternative Implementation I: In some implementations, a battery pack according to Alternative Implementation H, further includes wherein the bus bar includes a first material layer at least partially removed to from the second laser-cleaned bonding area. The second bonding area has a contrasting surface from a remainder of the bus bar.

Alternative Implementation J: In some implementations, a battery pack according to one of Alternative Implementations H to I, further includes the first material layer being is formed of anodized aluminum.

Alternative Implementation K: In some implementations, a system for preparing a battery pack for wire bonding includes the battery pack as in any one of Alternative Implementations H to J, a control unit, and a light source. The light source is configured to emit a laser beam associated with the laser-cut cutaway portion and the first and second laser-cleaned bonding areas.

Alternative Implementation L: In some implementations, a system of preparing a battery pack for wire bonding according to Alternative Implementation K, further includes a vision system. The vision system is configured to detect a contrast between a surface of the laser-cleaned second bonding area and the remainder of the bus bar.

Alternative Implementation M: In some implementations, a system of preparing a battery pack for wire bonding according to Alternative Implementation K, further includes a vision system. The vision system is configured to detect the first and second laser-cleaned bonding areas.

Alternative Implementation N: In some implementations, a system of preparing a battery pack for wire bonding according to any one of Alternative Implementations K to M, further includes the battery pack having a coating disposed on the bus bar. The coating has a contrast in color compared to the remainder of the bus bar. The coating surrounds the laser-cleaned second bonding area.

Alternative Implementation O: In some implementations, a system of preparing a battery pack for wire bonding according to any one of Alternative Implementations K to N, includes the vision system being configured to detect the contrast in the coating and the remainder of the bus bar.

Alternative Implementation P: In some implementations, a machine for wire bonding a battery pack includes a light source, a vision system, and a control unit. The battery pack includes a battery cell, a sleeve surrounding the battery cell, a bus bar having a first material layer, and a wire. The light source is configured to emit a laser beam. The vision system includes one or more cameras. The control unit is configured to communicate with the vision system and to position the laser beam. The laser beam is configured to prepare the battery for bonding by creating a first bonding are on the battery cell. The laser beam is configured to prepare the bus bar for bonding by creating a seconding bonding area on the bus bar. The vision system is configured to detect the first bonding area and the second bonding areas. The laser beam is configured to weld the wire to the first bonding area and the second bonding area.

Alternative Implementation Q: In some implementations, a machine according to Alternative Implementation P, further includes the laser beam being positioned via the control unit. Positioning the laser beam includes moving the laser beam in a predetermined pattern to cut-out a portion of the sleeve surrounding the battery cell to form the first bonding area. The predetermined pattern is rectangular, circular, or triangular.

Alternative Implementation R: In some implementations, a machine according to any one of Alternative Implementations P to Q, further includes the second bonding area being created by laser removing the first material layer of the bus bar. Removing the first material layer of the bus bar creates a contrast between the second bonding area and a remainder of the bus bar.

Alternative Implementation S: In some implementations, a machine according to any one of Alternative Implementations P to R, further includes the control unit being operable to implement an automatic cleaning and welding protocol of the battery pack.

Alternative Implementation T: In some implementations, a machine according to any one of Alternative Implementations P to S, further includes the machine being a hand-held system that is operated by a user.

Although the invention has been described in detail with reference to certain preferred implementations, variations and modifications exist within the scope and spirit of one or more independent aspects of the invention as described.

What is claimed:

1. A battery pack comprising:
   a supporting structure;
   a battery cell housed within the supporting structure;
   a sleeve at least partially surrounding the battery cell and extending over a portion of a first end of the battery cell, the sleeve having a laser-cut cutaway portion exposing a laser-cleaned first bonding area of the first end of the battery cell, the laser-cleaned first bonding area positioned adjacent an outer perimeter of the first end of the battery cell;
   a bus bar having a laser-cleaned second bonding area, the bus bar comprising a first material layer at least partially removed to form the laser-cleaned second bonding area, the laser-cleaned second bonding area having a contrasting surface from a remainder of the bus bar; and
   a wire bonded to each of the laser-cleaned first bonding area and the laser-cleaned second bonding area to electrically connect the battery cell to the bus bar.

2. The battery pack of claim 1, wherein the first material layer is formed of anodized aluminum.

3. A system for preparing a battery pack for wire bonding, the system comprising:
   a battery pack; including
      a supporting structure,
      a battery cell housed within the supporting structure,
      a sleeve at least partially surrounding the battery cell and extending over a portion of a first end of the battery cell, the sleeve having a laser-cut cutaway portion exposing a laser-cleaned first bonding area of the first end of the battery cell, the laser-cleaned first bonding area positioned adjacent an outer perimeter of the first end of the battery cell,
      a bus bar having a laser-cleaned second bonding area, the bus bar comprising a first material layer at least partially removed to form the laser-cleaned second bonding area, the laser-cleaned second bonding area having a contrasting surface from a remainder of the bus bar, and a wire bonded to each of the laser-cleaned first bonding area and the laser-cleaned second bonding area to electrically connect the battery cell to the bus bar;

a control unit; and a light source configured to emit a laser beam associated 5 with the laser-cut cutaway portion and the laser-cleaned first bonding area and the laser-cleaned second bonding area.

4. The system of claim 3, further comprising a vision system, the vision system configured to detect a contrast 10 between a surface of the laser-cleaned second bonding area and the remainder of the bus bar.

5. The system of claim 3, further comprising a vision system, the vision system configured to detect the laser-cleaned first bonding area and the laser-cleaned second 15 bonding area.

6. The system of claim 3, wherein the battery pack further includes a coating disposed on the bus bar, the coating having a contrast in color compared to a remainder of the bus bar, the coating surrounding the laser-cleaned second 20 bonding area.

7. The system of claim 6, further comprising a vision system, wherein the vision system is configured to detect the contrast in color of the coating compared to the remainder of the bus bar. 25

* * * * *